US 11,780,275 B2

(12) United States Patent
Effling et al.

(10) Patent No.: US 11,780,275 B2
(45) Date of Patent: Oct. 10, 2023

(54) VALVE FITTING FOR A TIRE ASSEMBLY OF A WORKING VEHICLE EQUIPPED WITH A CENTRAL TIRE INFLATION SYSTEM (CTIS)

(71) Applicant: Deere & Company, Moline, IL (US)

(72) Inventors: Zachary J. Effling, Cedar Falls, IA (US); Benjamin L. Borgmann, Waterloo, IA (US); Ashley M. Johnson, Waterloo, IA (US)

(73) Assignee: Deere & Company, Moline, IL (US)

( * ) Notice: Subject to any disclaimer, the term of this patent is extended or adjusted under 35 U.S.C. 154(b) by 421 days.

(21) Appl. No.: 17/010,394

(22) Filed: Sep. 2, 2020

(65) Prior Publication Data

US 2022/0063355 A1   Mar. 3, 2022

(51) Int. Cl.
*B60C 23/00* (2006.01)
*B60C 29/06* (2006.01)
(Continued)

(52) U.S. Cl.
CPC .. *B60C 23/00354* (2020.05); *B60C 23/00309* (2020.05); *B60C 29/064* (2013.01);
(Continued)

(58) Field of Classification Search
CPC .............. F16L 29/02; B60C 23/00354; B60C 23/00309; B60C 29/04; B60C 23/001
(Continued)

(56) References Cited

U.S. PATENT DOCUMENTS

| 833,143 | A | * | 10/1906 | Wolf | F16L 37/23 |
| | | | | | 184/105.3 |
| 1,073,719 | A | * | 9/1913 | Timmer | F16L 29/02 |
| | | | | | 137/538 |

(Continued)

FOREIGN PATENT DOCUMENTS

| DE | 102007033625 A1 | 1/2009 |
| EP | 0360427 B1 | 3/1992 |

(Continued)

OTHER PUBLICATIONS

German Search Report issued in application No. DE102021208259. 9, dated Mar. 18, 2022, 8 pages.
(Continued)

*Primary Examiner* — Craig M Schneider
*Assistant Examiner* — Frederick D Soski
(74) *Attorney, Agent, or Firm* — TUCKER ELLIS LLP (57) ABSTRACT

A valve fitting includes a fitting body defining a fitting passageway, supply and working ports in fluid communication with the fitting passageway, a supply port coupler operable to connect the supply port with an associated feed port coupler providing a pressurized fluid, a working port coupler operable to connect the working port with an associated tire of a tire assembly of an associated work vehicle, a supply valve moveable in the fitting passageway between a first position closing the fitting passageway from the supply port and a second position opening the fitting passageway to the supply port, a biasing assembly biasing the supply valve towards the first position, and an actuator assembly comprising an actuator member operable to urge the supply valve towards the second position against the bias of the biasing assembly in response to the associated feed port coupler being connected with the supply port coupler.

10 Claims, 4 Drawing Sheets

(51) Int. Cl.
  *F16L 29/02* (2006.01)
  *F16K 15/20* (2006.01)
  *F16L 37/413* (2006.01)
  *F16L 37/42* (2006.01)

(52) U.S. Cl.
  CPC .............. *F16K 15/20* (2013.01); *F16L 29/02* (2013.01); *F16L 37/413* (2013.01); *F16L 37/42* (2013.01)

(58) Field of Classification Search
  USPC ....... 251/149.6, 149.8, 149.9, 147, 148, 282
  See application file for complete search history.

(56) References Cited

U.S. PATENT DOCUMENTS

| | | | | |
|---|---|---|---|---|
| 1,266,192 A | * | 5/1918 | Anthony | F16K 15/20 285/190 |
| 1,278,300 A | * | 9/1918 | Brooks | F16L 29/02 251/149.4 |
| 1,855,264 A | * | 4/1932 | Thompson | F16L 29/02 137/630.22 |
| 2,392,501 A | * | 1/1946 | Pool | F16L 29/02 251/321 |
| 2,758,812 A | * | 8/1956 | Marcy | F02K 9/48 236/80 R |
| 2,842,381 A | * | 7/1958 | Franck | F16L 29/02 251/149.4 |
| 2,842,382 A | * | 7/1958 | Franck | F16K 35/02 251/149.4 |
| 2,881,793 A | * | 4/1959 | Lee | F15B 13/0417 251/360 |
| 2,919,935 A | * | 1/1960 | Nyberg | F16L 37/42 251/149.6 |
| 2,928,417 A | | 3/1960 | Buckner et al. | |
| 2,968,497 A | * | 1/1961 | Treleman | F16L 29/02 251/149.4 |
| 3,055,589 A | * | 9/1962 | Work | G05D 23/12 251/282 |
| 3,093,357 A | * | 6/1963 | Rodgers | F16L 29/02 251/149.4 |
| 3,112,764 A | * | 12/1963 | Anderson | F16K 3/26 251/282 |
| 3,276,503 A | * | 10/1966 | Kilmarx | B60C 23/00372 152/417 |
| 3,329,158 A | * | 7/1967 | Geiszler | B63C 11/2236 251/282 |
| 3,583,667 A | * | 6/1971 | Amneus, Jr. | F16L 37/252 285/376 |
| 3,825,222 A | * | 7/1974 | Petrova | F16L 29/02 251/149.6 |
| 4,186,910 A | * | 2/1980 | Higami | F16L 29/02 251/149.6 |
| 4,303,098 A | * | 12/1981 | Shindelar | F16L 37/23 137/596.2 |
| 4,373,551 A | * | 2/1983 | Shindelar | F16L 37/32 137/614.04 |
| 4,582,347 A | * | 4/1986 | Wilcox | F16L 37/00 439/348 |
| 4,685,501 A | * | 8/1987 | Williams | B60C 23/00327 152/417 |
| 4,924,926 A | * | 5/1990 | Schultz | B60C 23/00354 137/625.2 |
| 4,986,299 A | * | 1/1991 | Schultz | F16K 31/1221 251/63.4 |
| 5,040,559 A | * | 8/1991 | Ewing | F16K 51/02 251/129.08 |
| 5,524,664 A | * | 6/1996 | Lin | F16L 29/02 137/75 |
| 5,547,166 A | * | 8/1996 | Engdahl | F16L 37/23 251/149.6 |
| 5,553,638 A | * | 9/1996 | Home | F16L 29/02 251/149.6 |
| 5,582,201 A | * | 12/1996 | Lee | F16L 29/02 137/454.2 |
| 6,651,696 B2 | * | 11/2003 | Hope | F16K 17/046 251/282 |
| 6,691,978 B1 | * | 2/2004 | Bartos | F16L 29/02 251/149.6 |
| 8,632,052 B2 | * | 1/2014 | Liu | F16L 37/23 251/149.6 |
| 8,882,080 B2 | | 11/2014 | Tiberghien et al. | |
| 11,149,886 B1 | * | 10/2021 | Edler | F16L 37/46 |
| 2002/0047266 A1 | * | 4/2002 | Naito | F16L 29/02 285/322 |
| 2002/0124926 A1 | * | 9/2002 | Colussi | B60C 23/00354 152/417 |
| 2006/0197290 A1 | * | 9/2006 | Vallon | B25C 1/08 277/651 |
| 2009/0241655 A1 | * | 10/2009 | Ingram | B60C 23/00318 73/146.3 |
| 2009/0283190 A1 | * | 11/2009 | Padula | B60C 23/00363 152/417 |
| 2011/0017317 A1 | | 1/2011 | Pritschet | |
| 2011/0240897 A1 | * | 10/2011 | Gepraegs | F15B 13/024 251/282 |
| 2012/0024445 A1 | * | 2/2012 | Wilson | B60C 23/00327 152/415 |
| 2013/0276902 A1 | * | 10/2013 | Medley | B60C 23/00372 137/12 |
| 2013/0327420 A1 | * | 12/2013 | Liu | F16L 37/42 137/315.01 |
| 2014/0091244 A1 | * | 4/2014 | Gricourt | F01M 11/0408 251/148 |
| 2015/0029015 A1 | * | 1/2015 | Pierce | B60C 23/00372 340/442 |
| 2016/0288589 A1 | * | 10/2016 | Sidders | B60C 23/00363 |
| 2017/0114912 A1 | * | 4/2017 | Staedele | B60C 23/00354 |
| 2017/0159861 A1 | * | 6/2017 | Wyatt | F17C 1/00 |
| 2017/0204983 A1 | * | 7/2017 | Sidders | F16K 11/048 |
| 2017/0246922 A1 | * | 8/2017 | Tsiberidou | B60C 23/00363 |
| 2017/0299077 A1 | * | 10/2017 | Jabcon | B60C 23/00354 |
| 2017/0361667 A1 | | 12/2017 | Foor | |
| 2018/0087681 A1 | * | 3/2018 | Ehrlich | B60C 23/009 |
| 2019/0120412 A1 | * | 4/2019 | Wyatt | F16L 15/006 |
| 2019/0126693 A1 | * | 5/2019 | Balistreri | B60C 29/06 |
| 2019/0301651 A1 | * | 10/2019 | Tiberghien | F16L 37/34 |
| 2019/0316718 A1 | | 10/2019 | Tiberghien et al. | |
| 2021/0131600 A1 | * | 5/2021 | Newsome | F16J 15/0806 |
| 2021/0221185 A1 | * | 7/2021 | Benevelli | B60C 23/00318 |
| 2023/0022413 A1 | * | 1/2023 | Modak | A01D 34/243 |

FOREIGN PATENT DOCUMENTS

| EP | 0359424 B1 | 6/1992 |
| EP | 3227129 B1 | 10/2018 |
| WO | WO2019193414 A1 | 10/2019 |

OTHER PUBLICATIONS

Third Party Observation filed in German Application No. DE102021208259.9, dated Oct. 10, 2022, 40 pages.

* cited by examiner

VALVE FITTING FOR A TIRE ASSEMBLY OF A WORKING VEHICLE EQUIPPED WITH A CENTRAL TIRE INFLATION SYSTEM (CTIS)

FIELD OF THE DISCLOSURE

This disclosure relates to a valve fitting and, in particular, to a valve fitting providing an interface between a central tire inflation system (CTIS) and a tire assembly of a working vehicle such as a tractor, for example.

BACKGROUND

Working vehicles such as tractors have been provided with CTISs to adjust tire pressure to optimize vehicle performance in different operating conditions. CTISs are also particularly useful to minimize vehicle downtime during operation of the vehicle. Since the vehicle may be put into service for dozens of hours or days at a time such as for example during planting or harvest times, vehicle downtime during those periods can be very costly. CTISs typically include a compressor or pump providing a source of compressed air, several distribution pipes or other conduits for porting the compressed air from the compressor or pump to the several tire assemblies of the tractor, and a set of fittings including for example one or more swivel joints for allowing selected rotation between the various devices in the system.

Valve fittings may be provided at the termini of the CTIS distribution pipes or other conduits for coupling the CTIS with the tire volumes. It is typical however that the amount of space available for making connections at the tires is limited and, further, that this area of the vehicle at the tire rims or the like can be exposed to contact with vehicle-side hazards such as stiff crop impingements, debris accumulation, or the like. It is therefore important that the valve fitting be small and rugged.

In addition, it may be necessary at times to remove the tire from the CTIS and sometimes also from the vehicle such as for example to service or replace the tire. It is therefore also important that the valve fitting may be easily decoupled from the CTIS.

In may further be desired to maintain inflation in the tire after it is separated from the CTIS and removed from the vehicle. It may similarly be desirable also to maintain inflation in tires that are not attached to the vehicle or to the CTISs while the tires are in inventory or during shipment and before they are placed into service on the work vehicle.

SUMMARY

The embodiments herein provide a valve fitting that is small and rugged.

The embodiments herein further provide a valve fitting that is easily decoupled from and re-coupled with a CTIS of an associated work vehicle.

The embodiments herein further provide a valve fitting that is able to maintain the pressure within the tire, even when the tire is decoupled from the CTIS.

The embodiments herein further provide a valve fitting that is able to maintain the pressure within the tire, even when the tire is decoupled from the CTIS and removed from vehicle.

The embodiments herein further provide a valve fitting that facilitates maintenance of the pressure within the tire, even when the tire is decoupled from the CTIS.

The embodiments herein still further provide a valve fitting that facilitates maintenance of the pressure within the tire, even when the tire is decoupled from the CTIS and removed from vehicle.

The valve fitting herein advantageously maintains tire volume/pressure in associated tires even when a feed hose supplying pressurized air is detached thereby enabling enhanced assembly and service operations. The valve fitting herein is substantially "T" shaped having a swivel connection, and attaches with uniquely designed spud on the associated tire assembly that accepts the radial seal of the T-swivel connection. Using a piston/spring combination, and several seals, the valve fitting herein can seal tire volumes when the feed hose is disconnected. When connecting the hose with the valve fitting, the face seal of a standard fitting of an example embodiment depresses the piston, opening the air passage for inflate and deflate operations using a CTIS system. The valve fitting herein fitting also includes a user service fill valve so that the tire can be manually inflated or deflated at any time during service.

In accordance with an aspect of the disclosure, a valve fitting is provided. The valve fitting includes a fitting body defining a fitting passageway, supply and working ports in fluid communication with the fitting passageway, a supply port coupler operable to connect the supply port with an associated feed port coupler providing a pressurized fluid, a working port coupler operable to connect the working port with an associated tire of a tire assembly of an associated work vehicle, a supply valve moveable in the fitting passageway between a first position closing the fitting passageway from the supply port and a second position opening the fitting passageway to the supply port, a biasing assembly biasing the supply valve towards the first position, and an assembly comprising an abutment member operable to urge the supply valve towards the second position against the bias of the biasing assembly in response to the associated feed port coupler being connected with the supply port coupler.

In a further aspect of the disclosure in addition to the above aspect, the supply valve of the valve fitting comprises a piston assembly comprising a cylindrical piston body member having opposite first and second ends. The cylindrical piston body member is being movable between the first and second positions A, B along a path P defined by the fitting passageway, and the biasing assembly comprises a spring member biasing the cylindrical piston body member towards the first position A.

In a further aspect of the disclosure in addition to the above aspects, the fitting passageway defined by the fitting body of the valve fitting comprises a cylindrical passageway portion configured to receive the cylindrical piston body member therein, a main body passageway portion in operative fluid communication with the cylindrical passageway portion, the main body passageway portion being configured to receive the spring member therein, and a working fluid passageway in operative fluid communication with the main body passageway portion and with the cylindrical passageway portion, the working fluid passageway being operable to port the pressurized fluid from the fitting passageway to the working port for filling the associated tire of the tire assembly of the associated work vehicle with the pressurized fluid.

In a further aspect of the disclosure in addition to the above aspects, the piston assembly of the valve fitting comprises an interface on the first end of the cylindrical piston body member, wherein the interface adapts the cylindrical piston body member for engagement with the spring member, and the abutment member of the valve fitting is disposed on the second end of the cylindrical piston body member for urging the piston assembly towards the second position B against the bias of the spring member to open the cylindrical passageway portion to the supply port in response to the associated feed port coupler being connected with the supply port coupler.

In a further aspect of the disclosure in addition to the above aspects, the abutment member of the assembly of the valve fitting comprises an abutment member on the second end of the cylindrical piston body member, wherein the abutment member is configured to engage the associated feed port coupler, the abutment member moving the supply valve from the first position A to the second position B in response to the associated feed port coupler being connected with the supply port coupler.

In a further aspect of the disclosure in addition to the above aspects, the abutment member of the valve fitting is selectively disposed in a position extending from the fitting body for the supply valve in the first position A in response to the associated feed port coupler being disconnected from the supply port coupler, and is selectively disposed in a position retracted in the fitting body for the supply valve in the second position B in response to the associated feed port coupler being connected with the supply port coupler.

In a further aspect of the disclosure in addition to the above aspects, the abutment member of the valve fitting is formed integrally with the second end of the cylindrical piston body member.

In a further aspect of the disclosure in addition to the above aspects, the interface of the valve fitting comprises a continuous ridge member extending radially from the cylindrical piston body member. The continuous ridge member defines on opposite sides thereof inner and outer axial face surfaces, wherein the inner axial face surface is configured to engage the spring member, wherein the outer axial face surface is configured to selectively seal the cylindrical piston body member against a corresponding body sealing surface defined by the fitting body.

In a further aspect of the disclosure in addition to the above aspects, the body sealing surface of the valve fitting defines a chamfer, and the cylindrical piston body member of the valve fitting carries a sealing member adjacent to the outer axial face surface. The sealing member is adapted to engage the chamfer for the cylindrical piston body member in the first position A thereby closing the fitting passageway from the supply port.

In a further aspect of the disclosure in addition to the above aspects, the cylindrical piston body member of the valve fitting defines a longitudinal axis L, the second end of the cylindrical piston body member of the valve fitting defines a hollow inner space extending along the longitudinal axis L and opened to the supply port, and the second end of the cylindrical piston body member of the valve fitting defines a feed passageway in fluid communication with the hollow inner space, wherein the feed passageway extends axially through the cylindrical piston body member and is disposed adjacent to the continuous ridge member, wherein the feed passageway opens the hollow inner space of the cylindrical piston body member to the main body passageway portion for the supply valve in the second position B in response to the associated feed port coupler being connected with the supply port coupler.

In a further aspect of the disclosure in addition to the above aspects, the valve fitting further includes a service access port in fluid communication with the main body passageway portion, and a service access port coupler operable to connect the service access port with an associated user access port coupler permitting selective access by an associated user to the main body passageway portion.

In a further aspect of the disclosure in addition to the above aspects, the service access port coupler of the valve fitting comprises a threaded portion configured to receive the associated user access port coupler.

In a further aspect of the disclosure in addition to the above aspects, the threaded portion of the service access port coupler of the valve fitting is configured to receive a Schrader valve permitting the selective access by an associated user to the main body passageway portion.

In a further aspect of the disclosure in addition to the above aspects, the valve fitting further includes an elongate support stub member extending from the first end of the cylindrical piston body member along a longitudinal axis L defined by the cylindrical piston body member. In the example, the cylindrical passageway portion is configured to receive the second end of the cylindrical piston body member and a guide passageway portion of the fitting body is configured to receive the elongate stub member, wherein the cylindrical passageway portion and the guide passageway portion cooperatively support the cylindrical piston body member as the cylindrical piston body member is moved between the first and second positions A, B along a path P defined by the fitting passageway.

In a further aspect of the disclosure in addition to the above aspects, the valve fitting further includes a service access port in fluid communication with the main body passageway portion, and a service access port coupler operable to connect the service access port with an associated user access port coupler permitting selective access by an associated user to the main body passageway portion, wherein the service access port coupler comprises a threaded portion on a first side configured to receive the associated user access port coupler, and wherein the service access port coupler defines the guide passageway portion on a second side opposite from the first side.

In a further aspect of the disclosure in addition to the above aspects, the elongate support stub member of the valve fitting defines a hollow inner space extending along the longitudinal axis L and opened to the service access port and a feed passageway in fluid communication with the hollow inner space, wherein the feed passageway extends axially through the elongate support stub member, and wherein the feed passageway opens the hollow inner space of the elongate support stub member to the main body passageway portion for permitting the selective access by an associated user to the main body passageway portion.

In a further aspect of the disclosure in addition to the above aspects, the working port coupler of the valve fitting comprises a swivel coupler operable to connect the working port with a spud member of the associated tire assembly, wherein the swivel coupler permits relative rotation between the valve fitting body and the spud member of the associated tire assembly.

BRIEF DESCRIPTION OF THE DRAWINGS

In the accompanying drawings which are incorporated in and constitute a part of the specification, example embodiments of the novel valve fitting are illustrated, which, together with a general description of the invention given above, and the detailed description given below, serve to exemplify the example embodiments of the claimed invention.

DETAILED DESCRIPTION

The following describes one or more example embodiments of the disclosed valve fitting, as shown in the accompanying figures of the drawings described briefly above. Various modifications to the example embodiments may be contemplated by one of skill in the art.

As used herein, the "axial" direction may refer to a direction that is generally parallel to an axis of rotation, axis of symmetry, or centerline of a component or components. For example, in a cylinder with a centerline and opposite, circular ends, the "axial" direction may refer to the direction that generally extends in parallel with the centerline between the opposite ends. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft.

Also as used herein, "radially" aligned may refer to two components that are both disposed along a line extending perpendicularly outwardly from a shared center line, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" aligned although one or both of the components may not be cylindrical (or otherwise radially symmetric). For example, a rotating shaft may be "radially" aligned with a rectangular housing containing the shaft over a length of the shaft that axially overlaps with the housing.

Figure 1:
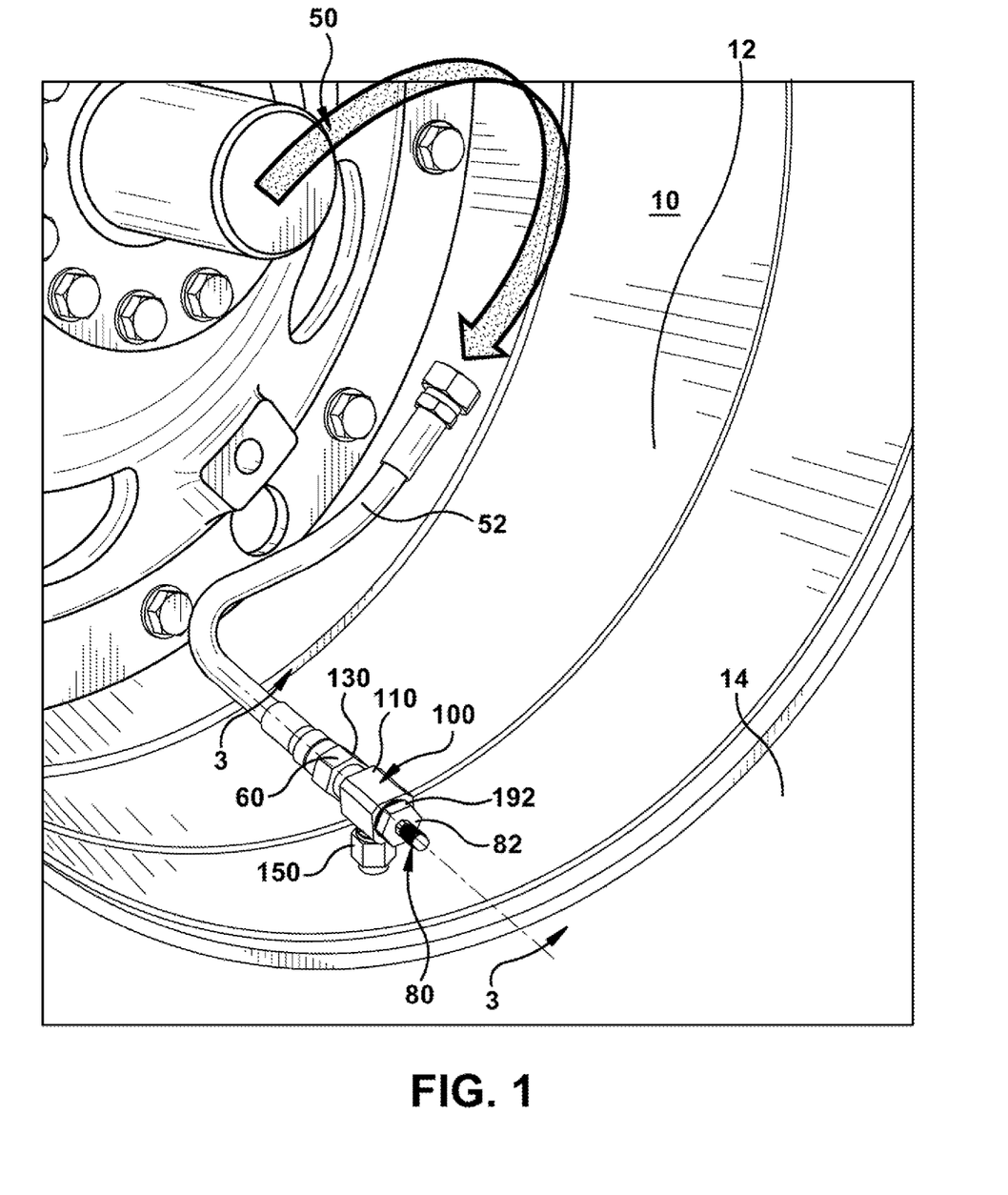
FIG. 1 is a view showing a valve fitting in accordance with an example embodiment applied to a tire assembly of a tractor with CTIS.

FIG. 1 is a view showing a valve assembly 1 having a valve fitting 100 in accordance with an example embodiment in use on a tire assembly 10 of an associated work vehicle (not shown) and coupled with a CTIS 50 of the work vehicle. As shown, the valve fitting 100 is disposed between a rim 12 of the tire assembly 10 and a feed line 52 of the CTIS 50. In that way, a pressurized fluid such as air for example provided by the CTIS 50 may be used to maintain the pressure within a tire 14 of the tire assembly 10 to within a desired pressure range using the feed line 52 communicating the pressurized air from the CTIS 50 to the valve fitting 100.

The valve fitting 100 in accordance with the example embodiment illustrated includes a fitting body 110 having an overall generally "T" shape. The fitting body 110 defines an internal fitting passageway 112 (FIGS. 2-4) as will be described in greater detail below. In the example embodiment, the internal fitting passageway 112 also has an overall generally "T" shape that substantially matches the overall shape of the fitting body 110.

A supply port coupler 130 of the valve fitting 100 of the example embodiment is operable to connect the fitting body 110 with an associated feed port coupler 60 providing a pressurized fluid such as air for example from the CTIS to the internal fitting passageway 112 of the valve fitting 100. In the application illustrated, the feed port coupler 60 connects an end of the feed line 52 local to the valve fitting 100 of the example embodiment, thereby making it easier to connect and disconnect the tire assembly 10 from the CTIS 50 by simply coupling and decoupling the feed port coupler 60 from the supply port coupler 130 of the subject valve fitting 100. In the example embodiment, the feed port coupler 60 can be coupled and/or decoupled from the supply port coupler 130 of the subject valve fitting 100 as may be necessary or desired.

Similarly, a working port coupler 150 of the valve fitting 100 of the example embodiment is operable to connect the fitting body 110 with a tire port coupler 70 (FIGS. 2-4) for communicating the pressurized fluid such as air for example between the internal fitting passageway 112 of the valve fitting 100 and the tire assembly 10. The tire port coupler 70 may extend through the rim 12 of the tire assembly 10 in a manner to be described in greater detail below for permitting the pressurized fluid to flow between the valve fitting 100 and the internal space of the tire 14 of the tire assembly 10 thereby helping to maintain the tire 12 within a desired pressure range.

A service port coupler 192 of the valve fitting 100 of the example embodiment is operable to connect the fitting body 110 with an associated user access coupler 80 providing access to the pressurized fluid such as air for example within the internal fitting passageway 112 of the valve fitting 100. In the example embodiment illustrated, the user access coupler 80 is a Schrader valve 82 known commonly in the industry. However other types of user access couples may be used as well such as for example a Presta valve (not shown). Valves of this type enable user access to the internal fitting passageway such as to add pressurized fluid to the tire assembly 10 as deemed necessary or desired, and/or to check the pressure within the tire assembly 10 without disturbing the connection of the tire assembly 10 with the associated CTIS 50. In another embodiment the user access coupler 80 may be a simple solid plug (not shown) for sealing off the internal fitting passageway to user access such as for applications where servicing or the like may not be necessary or may even be undesirable or not permitted. In a further embodiment, the user access coupler 80 may comprise a small pressure gauge (not shown) so the users may visually inspect the pressure within the tire assembly 10 by simply reading the position of a gauge dial or the like.

Figure 2:
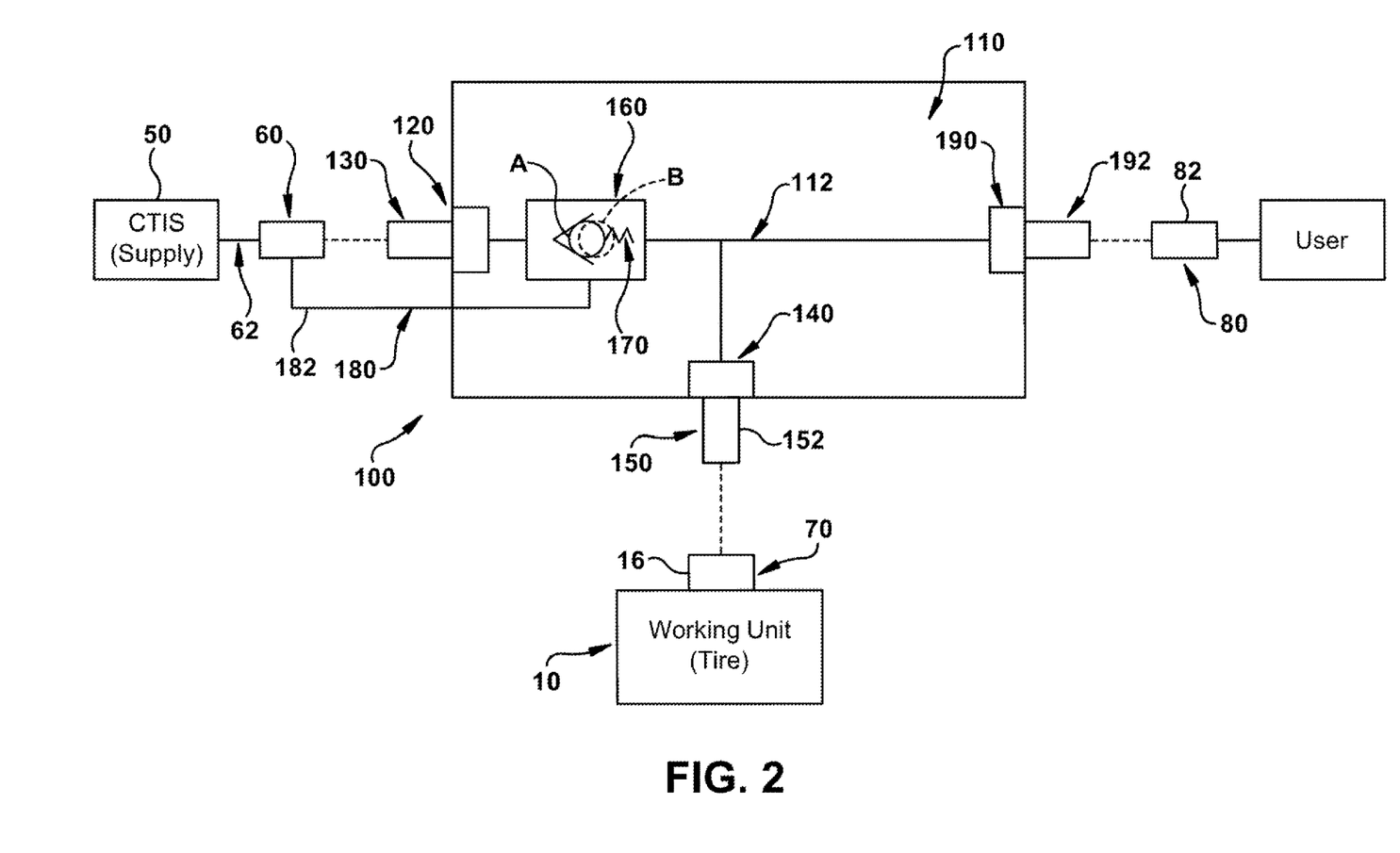
FIG. 2 is a schematic illustration of the valve fitting of FIG. 1 in accordance with an example embodiment.

FIG. 2 is a schematic illustration of the valve fitting 100 in accordance with an example embodiment. The valve fitting 100 includes a fitting body 110 defining a fitting passageway 112 therein. A supply port 120 is provided by the fitting body 110. As shown schematically in the Figure, the supply port 120 is in fluid communication with the fitting passageway 112. The valve fitting 100 further includes a supply port coupler 130 operable to connect the supply port 120 with an associated feed port coupler 60 providing or otherwise communicating a pressurized fluid from a source such as for example from an associated CTIS 50 via a flexible feed line hose 52.

The valve fitting 100 in accordance with the example embodiment further includes a working port 140 in fluid communication with the fitting passageway 112 defined in or by the fitting body 110. In addition, a working port coupler 150 is provided. The working port coupler 150 is operable to connect the working port 140 with a tire port coupler 70 providing the pressurized fluid such as air for example from the internal fitting passageway 112 of the valve fitting 100 to the tire assembly 10. The tire port coupler 70 may extend through the rim 12 (FIGS. 1, 2, 4) of the tire assembly 10 in a manner for permitting the pressurized fluid to flow between the valve fitting 100 and the internal space of the tire 14 of the tire assembly 10 thereby helping to maintain the tire 12 within a desired pressure range.

The working port coupler 150 of the example embodiment is a swivel coupler 152 operable to connect the working port 140 with a spud member 16 of the associated tire assembly 10. The swivel coupler 152 permits relative rotation between the valve fitting body 110 and the spud member 16 of the associated tire assembly 10.

In further addition to the above, the valve fitting 100 in accordance with the example embodiment also includes a supply valve 160 moveable in the fluid passageway 112 between a first position A illustrated in the Figure as a solid line closing the fitting passageway between the supply port 120 and the remainder of the fitting passageway 112, and a second position B illustrated in the Figure as a dashed line providing an air opening between the fitting passageway 112 and the supply port 120. A biasing assembly 170 is provided for biasing the supply valve 160 towards the first position A, thereby biasing the supply valve 160 to the position closing the fitting passageway 112 from the supply port 120. The natural state of the supply valve 160 is thus that it closes or otherwise seals off the supply port 120 from the internal fitting passageway 112 absent an offsetting force sufficient to counteract a biasing force generated by the biasing assembly 170. The supply valve 160 may therefore operate as a check valve within the fitting body 110.

An assembly 180 is provided in the valve fitting 100 of the example embodiment. The assembly 180 includes an abutment member 182 operable to urge the supply valve 160 towards the second position B in response to the associated feed port coupler 60 of the associated CTIS 50 being connected with the supply port coupler 130. In the example embodiment, the abutment member 182 is operable to urge the supply valve 160 from the first position towards the second position B in response to the associated feed port coupler 60 of the associated CTIS 50 being connected with the supply port coupler 130. In addition, the abutment member 182 is operable to permit the supply valve 160 to return to the first position A in response to the associated feed port coupler 60 of the associated CTIS 50 being disconnected from the supply port coupler 130. In this way, the supply valve 160 together with the assembly 180 may therefore operate as an open passage allowing bidirectional flow within the fitting body 110 for opening the fitting passageway 112 for fluid connection with the supply port 120 when the associated feed port coupler 60 of the associated CTIS 50 is connected with the supply port coupler 130, and for closing the fitting passageway 112 off from fluid connection between the supply port 120 and the fitting passageway 112 when the associated feed port coupler 60 of the associated CTIS 50 is disconnected from the supply port coupler 130.

In this way, the embodiments herein provide a valve fitting 100 that is easily decoupled from and re-coupled with an associated CTIS 50 of an associated work vehicle (not shown). In this way also, the embodiments herein further provide a valve fitting 100 that is able to maintain the pressure within the tire 14, even when the tire 14 is decoupled from the CTIS 50 and, as desired, removed from vehicle. In the example embodiment, the supply valve 160 operates as a check valve within the fitting body 110 for beneficially providing a functionality of allowing pressure to be maintained within the tire 14, even when the tire 14 is decoupled from the CTIS 50 and removed from vehicle.

The valve fitting 100 in accordance with the example embodiment further includes a service access port 190 in fluid communication with the fitting passageway 112 defined in or by the fitting body 110. In addition, a service access port coupler 192 is provided. The service access port coupler 192 of the valve fitting 100 of the example embodiment is operable to connect the fitting body 110 with an associated user access coupler 80 providing access to the pressurized fluid such as air for example within the internal fitting passageway 112 of the valve fitting 100. In the example embodiment illustrated, the user access coupler 80 is a Schrader valve 82 known commonly in the industry. However other types of user access couples may be used as well such as for example a Presta valve (not shown) or any others that provide similar functionality. The user access coupler 80 enables user access to the internal fitting passageway 112 such as to add pressurized fluid to the tire assembly 10 as deemed necessary or desired, and/or to check the pressure within the tire assembly 10 without disturbing or otherwise interrupting or disrupting the connection of the tire assembly 10 to the associated CTIS 50. In another embodiment, the user access coupler 80 may be a simple solid plug (not shown) for sealing off the internal fitting passageway as user access such as for servicing or the like may not be necessary. In a further embodiment, the user access coupler 80 may comprise a small pressure gauge (not shown) so the users may visually inspect the pressure within the tire assembly 10 by simply reading the position of a gauge dial or the like.

Figure 3:
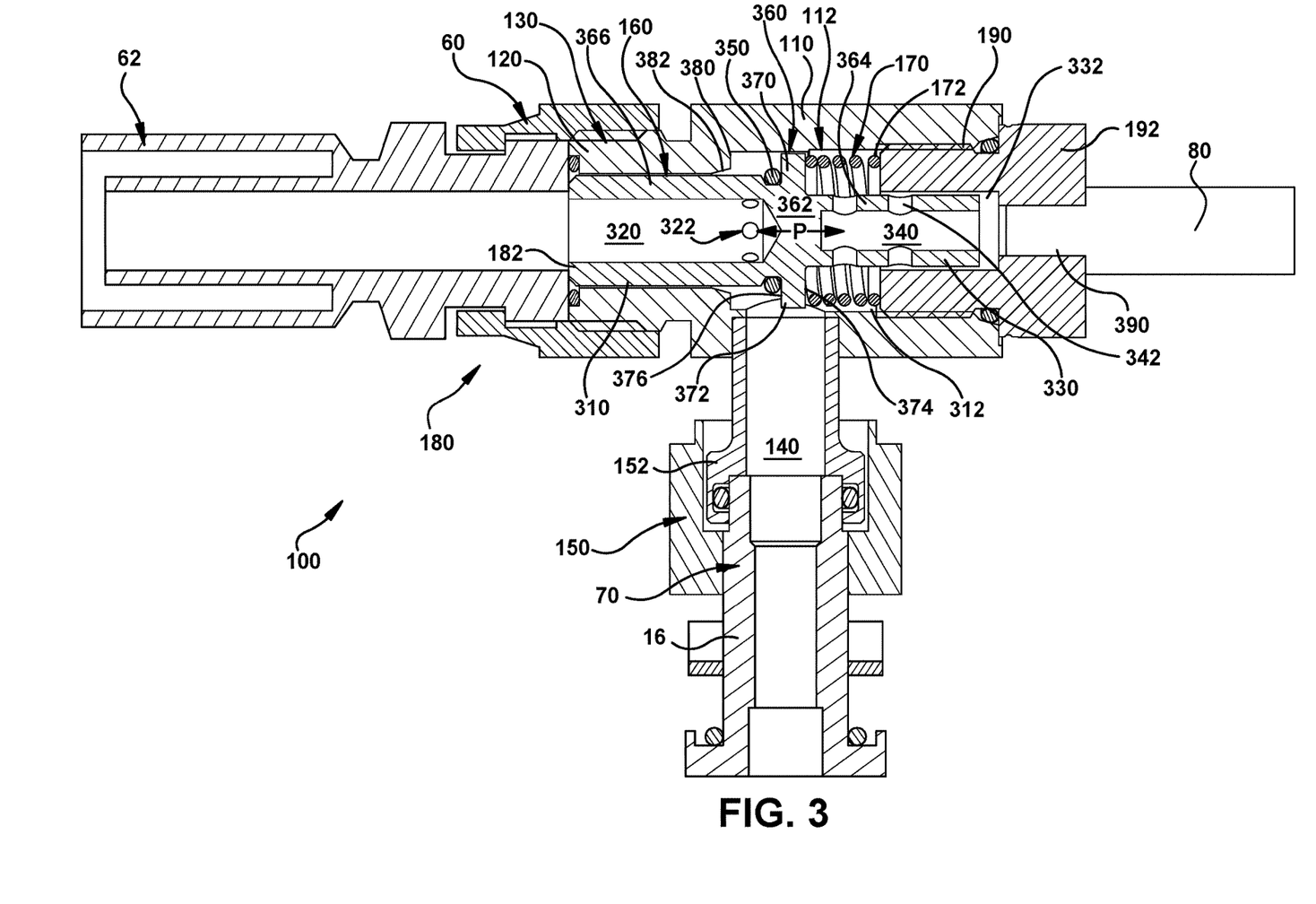
FIG. 3 is a partial cross-sectional view of the valve fitting of FIGS. 1 and 2 taken along line 3-3 of FIG. 2 showing the valve fitting connected with an associated feed port coupler of an associated CTIS, and a schematical view of a user access valve.
Figure 4:
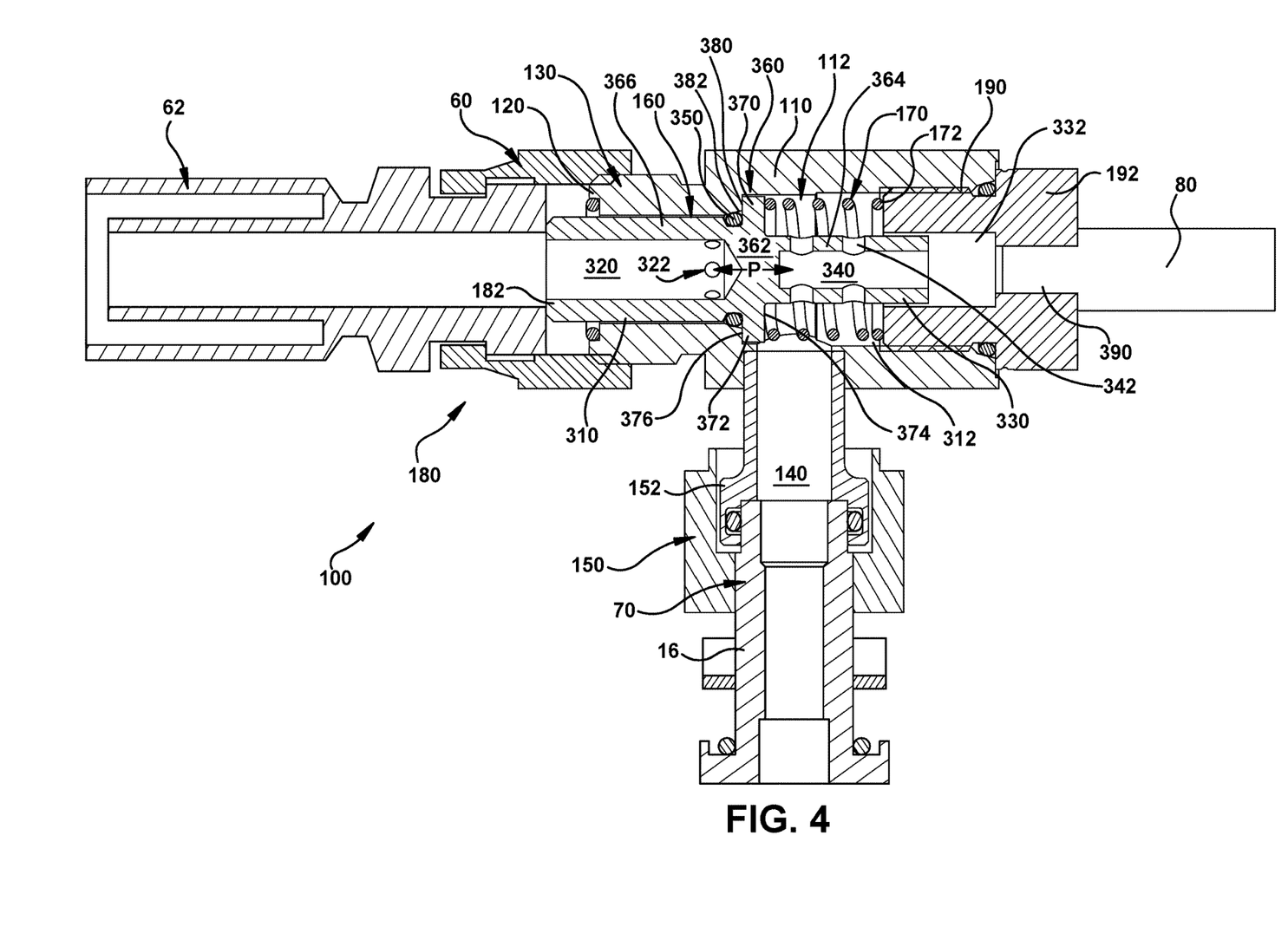
FIG. 4 is a partial cross-sectional view of the valve fitting of FIGS. 1-3 showing the valve fitting disconnected from the associated feed port coupler of the associated CTIS, and a schematical view of a user access valve.

FIG. 3 is a cross-sectional view of the valve fitting 100 of FIGS. 1 and 2 taken along line 3-3 of FIG. 2 showing the valve fitting 100 connected with an associated feed port coupler 60 of an associated CTIS 50. FIG. 4 is a cross-sectional view of the valve fitting of FIGS. 1-3 showing the valve fitting 100 disconnected from the associated feed port coupler 60 of the associated CTIS 50. With reference now to those Figures, a valve fitting 100 in accordance with an example embodiment includes a fitting body 110 defining a fitting passageway 112, a supply port 120 in fluid communication with the fitting passageway 112, and a working port 140 in fluid communication with the fitting passageway 112.

A supply port coupler 130 is provided and is operable to connect the supply port 120 with an associated feed port coupler 60 providing a pressurized fluid such as air for example, from a CTIS. The associated feed port coupler 60 may be a standard ISO 8434-3 fitting and may be operable as explained herein in the example embodiment to depress a piston assembly 360, opening the air passage for inflate and deflate operations using the CTIS system. In addition, a working port coupler 150 is further provided and is operable to connect the working port 140 with an associated tire 14 of a tire assembly 10 of an associated work vehicle.

The working port coupler 150 of the example embodiment is a swivel coupler 152 operable to connect the working port 140 with a spud member 16 of the associated tire assembly 10. The swivel coupler 152 permits relative rotation between the valve fitting body 110 and the spud member 16 of the associated tire assembly 10.

A supply valve 160 is provided for opening and closing the flow of the pressurized fluid so that the associated tire assembly may be removed from the CTIS, as well as from the vehicle, as may be necessary and/or desired. The supply valve 160 is moveable in the fitting passageway 112 between a first position A (FIG. 4) closing the fitting passageway from the supply port 120, and a second position B (FIG. 3) opening the fitting passageway to the supply port 120.

A biasing assembly 170 biases the supply valve 160 towards the first position A. An assembly 180 is provided and includes an abutment member 182 operable to urge the supply valve 160 towards the second position B against the bias of the biasing assembly 170 in response to the associated feed port coupler 60 being connected with the supply port coupler 130.

Although any type of valve may be used equivalently, the supply valve 160 in accordance with the example embodiment includes a piston assembly 360 including a cylindrical piston body member 362 having opposite first 364 and second 366 ends. It is too be appreciated that the cylindrical piston body member 362 is movable between the first A (FIG. 4) and second B (FIG. 3) positions along a path P defined by the fitting passageway 112.

Although any type of biasing assembly may be used equivalently, the biasing assembly 170 of the example embodiment is a spring member 172 biasing the cylindrical piston body member 362 towards the first position A (FIG. 4). As shown, the spring member 172 is a standard spiral spring having a desired spring constant for effecting the biasing an accordance with the subject application.

As described above, the fitting body 110 of the valve fitting 100 according to the example embodiment defines a fitting passageway 112. As shown, the fitting passageway 112 of the example embodiment includes a cylindrical passageway portion 310, a main body passageway portion 312 in operative fluid communication with the cylindrical passageway portion 310, and a working fluid passageway 314 in operative fluid communication with the main body passageway portion 312 and with the cylindrical passageway portion 310. The cylindrical passageway portion 310 is configured to receive the cylindrical piston body member 362. The main body passageway portion 312 is configured to receive the spring member 172 therein. The working fluid passageway 314 is operable to port the pressurized fluid from the fitting passageway 112 to the working port 140 for filling the associated tire 14 of the tire assembly 10 of the associated work vehicle with the pressurized fluid.

Also as shown in the Figures, the cylindrical passageway portion 310 and the main body passageway portion 312 are substantially mutually parallel. In particular, the cylindrical passageway portion 310 and the main body passageway portion 312 may be co-linear as shown. As described, the supply valve 160 is moveable in the fitting passageway 112 between a first position A (FIG. 4) closing the fitting passageway from the supply port 120, and a second position B (FIG. 3) opening the fitting passageway to the supply port 120. The supply valve 160 is guided in its moveable in the fitting passageway 112 between a first position A (FIG. 4) closing the fitting passageway from the supply port 120, and a second position B (FIG. 3) opening the fitting passageway to the supply port 120. In this regard, an elongate stub member 330 on the first 364 end of the cylindrical piston body member 362 of the piston assembly 360 is slidably guided by a guide passageway portion 332 of the fitting body 110 configured to receive the elongate stub member 330. Also in this regard, the second 366 end of the cylindrical piston body member 362 of the piston assembly 360 is slidably guided by the inner wall of the cylindrical passageway portion 310 of the fitting passageway 112 defined in the fitting body 110 of the valve fitting 100.

Also as shown in the Figures, the working fluid passageway 314 extends in the subject valve fitting 100 in a direction substantially perpendicular to the cylindrical and main body passageway portions 310, 312 in accordance with the overall "T" shape of the valve fitting. The embodiments herein therefore provide a valve fitting that is small and rugged since the generally "T" shape permits the various connections and access ports to be disposed in a convenient relationship relative to the associated tire assembly 10 as shown best in FIG. 1.

An interface 370 is provided on the cylindrical piston body member 362 of the piston assembly 360. The interface 370 adapts the cylindrical piston body member 362 for engagement with the spring member 172. The spring member 172 and the interface 370 of the piston body member 362 may be coupled or otherwise fastened together or they may be simply arranged within the passageways of the fitting body 110 in a pre-loaded manner as illustrated so that the additional step of fastening the parts together may be avoided to save manufacturing time and costs.

In accordance with the example embodiment, the abutment member 182 is disposed on the second end 366 of the cylindrical piston body member 362 for urging the piston assembly 360 towards the second position B (FIG. 3) against the bias of the spring member 172 to open the cylindrical passageway portion 310 to the supply port 120 in response to the associated feed port coupler 60 being connected with the supply port coupler 130.

In accordance with the example embodiment, the abutment member 182 of the assembly 180 is disposed on the second end 366 of the cylindrical piston body member 362. The abutment member 182 is configured to engage the associated feed port coupler 60. In operation, the abutment member 180 moves the supply valve 160 from the first position A (FIG. 4) to the second position B (FIG. 3) in response to the associated feed port coupler 60 being connected with the supply port coupler 130. Using a piston/spring combination, and several seals, the valve fitting can seal tire volumes when the feed hose is disconnected. When connecting the hose with the valve fitting, the face seal of a standard ISO 8434-3 fitting of an example embodiment depresses the piston, opening the air passage for inflate and deflate operations using a CTIS system.

The abutment member 182 of the example embodiment extends from the fitting body so that it may be operated automatically when the associated feed port coupler 60 is connected with or attached to the supply port coupler 130, and also when the associated feed port coupler 60 is disconnected or detached from the supply port coupler 130. The operations may occur, for example, as the various members transition between the arrangements shown in FIG. 4 (decoupled) and FIG. 3 (coupled). In particular, the abutment member 182 is selectively disposed in a position extending from the fitting body 110 for the supply valve 160 in the first position A (FIG. 4) in response to the associated feed port coupler 60 being disconnected from the supply port coupler 130. Also in particular, the abutment member 182 is selectively disposed in a position retracted in the fitting body 110 for the supply valve 160 in the second position B (FIGS. 1 and 3) in response to the associated feed port coupler 60 being connected with the supply port coupler 130. The embodiments herein therefore provide a valve fitting 100 that is easily decoupled from and re-coupled with a CTIS 50 of an associated work vehicle. In addition, the supply valve 160 disposed in the first position A (FIG. 4) provides a valve fitting 100 that is able to maintain the pressure within the tire 14 of the tire assembly 10, even when the tire is decoupled from the CTIS 50 and removed from vehicle.

The abutment member 182 of the valve fitting 100 according to the example embodiment may be provided on or formed integrally with the piston assembly 360. In accordance with the example embodiment illustrated, however, the abutment member 182 is formed integrally with the second end 366 of the cylindrical piston body member 362. The additional step of fastening the parts together may therefore be avoided to save manufacturing time and costs.

As described above, an interface 370 is provided on the first end 364 of the cylindrical piston body member 362 of the piston assembly 360. The interface 370 adapts the cylindrical piston body member 362 for engagement with the spring member 172 and is also used in helping to seal the cylindrical piston body member 362 with a selected one or more portions of the fitting body 110. In the example embodiment illustrated, the interface 370 is provided as a continuous ridge member 372 extending radially from the cylindrical piston body member 362. The continuous ridge member 372 defines, on opposite sides thereof, inner 374 and outer 376 axial face surfaces. In the embodiment, the inner axial face surface 374 is configured to engage the spring member 172, and the outer axial face surface 376 is configured to selectively seal the cylindrical piston body member 362 against a corresponding body sealing surface 380 defined by the fitting body 110.

For purposes of sealing the various components of the valve fitting 100, the body sealing surface 380 defines a chamfer 382, and the cylindrical piston body member 362 carries a sealing member 350 adjacent to the outer axial face surface 376. The sealing member 350 may be for example an O-ring adapted to engage the chamfer 382 for the cylindrical piston body member 362 in the first position A thereby closing the fitting passageway 112 from the supply port 120.

The cylindrical piston body member 362 of the valve fitting 100 can have various shapes and configurations as may be necessary or desired to perform the functions described herein, but in the example embodiment illustrated it in general defines a longitudinal axis L. As shown, the second end 366 of the cylindrical piston body member 362 defines a hollow inner space 320 extending along the longitudinal axis L and opened to the supply port 120. The second end 366 of the cylindrical piston body member 362 also defines a feed passageway 322 in fluid communication with the hollow inner space 320. In the example embodiment, the feed passageway 322 extends axially through the cylindrical piston body member 362 and is disposed adjacent to the continuous ridge member 372. Operationally, the feed passageway 322 opens the hollow inner space 320 of the cylindrical piston body member 362 to the main body passageway portion 312 for the supply valve 160 in the second position B in response to the associated feed port coupler 60 being connected with the supply port coupler 130.

With continued reference to the drawing Figures and in particular to FIGS. 3 and 4, the valve fitting 100 according to the example embodiment further includes a service access port 190 in fluid communication with the main body passageway portion 312. A service access port coupler 192 is provided and is operable to connect the service access port 190 with an associated user access port coupler 80 permitting selective access by an associated user to the main body passageway portion 312. The embodiments herein therefore provide a valve fitting that is able to maintain the pressure within the tire and, further, to permit re-filling the tire or otherwise servicing the tire via the service access port 190, the service access port coupler 192, and the associated user access port coupler 80, even when the tire is decoupled from the CTIS 50 and removed from vehicle.

In the example embodiment shown, the service access port coupler 192 of the valve fitting 100 is a threaded portion 390 configured to receive the associated user access port coupler 80. In particular and as shown, the threaded portion 390 of the service access port coupler 192 of the valve fitting 100 is configured to receive a Schrader valve 82 permitting the selective access by an associated user to the main body passageway portion 312. However, other types and styles of user access port couplers 80 may be used as necessary or desired in accordance with the application of the subject valve fitting 100.

The cylindrical piston body member 362 of the valve fitting 100 can have various shapes and configurations as may be necessary or desired to perform the functions described herein, but in the example embodiment illustrated it in general further defines an elongate support stub member 330 extending from the first end 364 of the cylindrical piston body member 362 along a longitudinal axis L defined by the cylindrical piston body member 362. In the example embodiment, the cylindrical passageway portion 310 is configured to receive the second end 366 of the cylindrical piston body member 362 and a guide passageway portion 332 of the fitting body 110 is configured to receive the elongate stub member 330. In that way, the cylindrical passageway portion 310 and the guide passageway portion 332 may cooperatively support the cylindrical piston body member 362 as the cylindrical piston body member 362 is moved between the first and second positions A, B along a path P defined by the fitting passageway 112. In the example embodiment, the path P is parallel with the axes defined by the cylindrical passageway portion 310 and the main body passageway portion 312 that are themselves substantially mutually parallel. In particular, the path P of the cylindrical piston body member 362 of the valve fitting 100 may be co-linear with the axes of the cylindrical passageway portion 310 and the main body passageway portion 312 as shown.

In accordance with the example embodiment, the service access port coupler 192 of the valve fitting 100 includes a threaded portion 390 on a first side configured to receive the associated user access port coupler 80, and the access port coupler 192 defines the guide passageway portion 332 on a second side opposite from the first side. The elongate support stub member 330 described above may define a hollow inner space 340 extending along the longitudinal axis L and opened to the service access port 190 and a feed passageway 342 in fluid communication with the hollow inner space 340. The feed passageway 342 may extend axially through the elongate support stub member 330, wherein the feed passageway 342 opens the hollow inner space 340 of the elongate support stub member 330 to the main body passageway portion 312 for permitting the selective access by an associated user to the main body passageway portion 312.

As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

The invention claimed is:

1. A valve assembly comprising:
a fitting body defining a fitting passageway;
a supply valve moveable in the fitting passageway between closed and open positions, the supply valve comprising:
  a first cylindrical end having a first longitudinal passage and at least one first radial port;
  a second cylindrical end having a second longitudinal passage and at least one second radial port;
a biasing assembly biasing the supply valve towards the closed position;
a feed coupler coupling the fitting body with an associated central tire inflation system (CTIS) supply;
a working coupler coupling the supply valve with an associated tire assembly;
a user access valve; and
a user access coupler coupling the fitting body with the user access valve,
wherein a feed flow path is defined by fluid flow through the CTIS supply, the feed coupler, the second cylindrical end, the working coupler, and the tire assembly;
wherein an access flow path is defined by fluid flow through the user access valve, the user access coupler, the first cylindrical end, the working coupler, and the tire assembly,
wherein:
  in the closed position, the supply valve closes the feed flow path, and opens the access flow path; and
  in the open position, the supply valve opens the feed flow path and opens the access flow path.

2. The valve assembly according to claim 1, wherein:
the second end of the supply valve forms an abutment member configured such that the abutment member engages the feed port coupler, the feed port coupler moving the supply valve from the closed position to the open position in response to the feed port coupler being connected with the fitting body.

3. The valve assembly according to claim 2, wherein:
the abutment member extends from the fitting body when the supply valve is in the first position in response to the feed port coupler being disconnected from the fitting body; and
the abutment member is retracted into the fitting body when the supply valve is in the open position in response to the feed port coupler being connected with the fitting body.

4. The valve assembly according to claim 2, wherein:
the abutment member is formed integrally with the second cylindrical end.

5. The valve assembly according to claim 1, wherein:
the biasing assembly comprises a spring.

6. The valve assembly according to claim 1, wherein:
the supply valve comprises a sealing member that contacts a chamfer of the fitting body.

7. The valve assembly according to claim 1, wherein:
the user access port coupler is threaded to the user access valve permitting selective access by an associated user to the fitting body.

8. The valve assembly according to claim 1, wherein the user access valve permits selective access by an associated user to the access flow path.

9. The valve assembly according to claim 1, wherein the working port coupler comprises a swivel coupler connecting the working port with a spud member of the associated tire assembly, wherein the swivel coupler permits relative rotation between the fitting body and the spud member of the associated tire assembly.

10. The valve assembly according to claim 1, wherein:
the first cylindrical end of the supply valve guides the supply valve within the access coupler; and
the second cylindrical end of the supply valve guides the supply valve within the fitting body.

* * * * *